United States Patent [19]

Massa

[11] Patent Number: 4,763,307

[45] Date of Patent: Aug. 9, 1988

[54] WIDE-RANGE AUDIO FREQUENCY UNDERWATER TRANSDUCER

[75] Inventor: Frank Massa, 280 Lincoln St., Hingham, Mass. 02043

[73] Assignees: Frank Massa; Donald P. Massa; Gitta M. Kurlat; Trustees of the Stoneleigh Trust, all of Cohasset, Mass.

[21] Appl. No.: 4,441

[22] Filed: Jan. 20, 1987

[51] Int. Cl.$^4$ .............................................. H04R 13/00
[52] U.S. Cl. ................................. 367/174; 367/175; 367/172; 181/110
[58] Field of Search .............. 367/172, 173, 174, 175, 367/142; 181/110, 402

[56] References Cited

U.S. PATENT DOCUMENTS

| | | | |
|---|---|---|---|
| 1,640,538 | 8/1927 | Du Bois-Reymond | 367/175 |
| 2,405,179 | 7/1946 | Black et al. | 367/172 |
| 2,903,673 | 9/1959 | Harris | 367/174 |
| 2,978,669 | 4/1961 | Harris | 367/172 |
| 3,118,125 | 1/1964 | Sims | 367/172 |
| 3,760,346 | 9/1973 | Kieser et al. | 367/172 |
| 4,025,912 | 5/1977 | Rice | 340/870.17 |
| 4,466,083 | 8/1984 | Willard et al. | 367/175 |
| 4,607,382 | 8/1986 | Dijkstra et al. | 381/194 |

FOREIGN PATENT DOCUMENTS 1029846  4/1978  Canada .

Primary Examiner—Charles T. Jordan
Assistant Examiner—John W. Eldred

[57] ABSTRACT

A wide-range audio frequency underwater transducer is designed to make use of a massive small diameter vibratile piston driven by electromagnetic oscillatory forces to transmit omnidirectional uniform sound pressure level over the frequency range 100 Hz to 5 kHz. The rugged transducer design is adapted for low-cost mass production and can be used as a highly reliable expendable reference standard of source level for the calibration of in-situ stationary or moving sonar receiving systems. The magnitude of the source level can be accurately controlled by the magnitude of the electrical current supplied to the electrical winding over the entire frequency range of operation. A pressure equalization system is included in the design that permits use of the transducer at any depth down to 500 feet.

20 Claims, 1 Drawing Sheet

WIDE-RANGE AUDIO FREQUENCY UNDERWATER TRANSDUCER

This invention is concerned with underwater transducers and particularly with the design of a transmitting transducer for operating over a wide audio frequency range for use as a reliable sound source that can be employed as a reference standard of source level for making underwater calibrations of hydrophones or sonar receiving arrays over the audible frequency range.

The primary object of this invention is to design an underwater transducer that will transmit a very uniform source level over the frequency range 100 Hz to 5 kHz.

Another object of this invention is to provide a design that produces a very stable source level output as a function of the electrical input to the transducer.

Still another object of the invention is to insure that the uniformity and stability of the source level generated by the transducer is independent of the depth of operation down to several hundred feet.

Still another object of the invention is to provide high structural reliability to permit use of the transducer in rough seas.

Another object of the invention is to design a low-cost structure that can be used as a self-contained expendable accurate sound source that can be launched from an aircraft or surface ship and used to calibrate a sonar receiver which is either anchored at sea or being moved through the sea under actual operating conditions.

Still another object of the invention is to greatly increase the source level of a relatively small lightweight, wide-range, underwater transducer by using the vibratile diaphragm portion of the transducer as a heat sink to conduct the heat generated in the electrical portion of the electromechanical drive system directly to the vibratile piston which in turn transmits the heat directly to the water in which the transducer is immersed during operation.

These and other objects, features, and advantages of the invention will become more fully apparent from the following detailed description taken in conjunction with the accompanying drawings in which.

Figure 2:
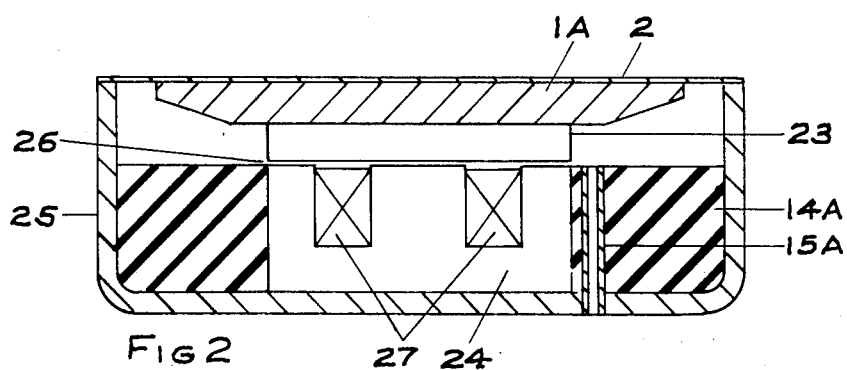
FIG. 2 is a vertical cross-sectional view of an alternate form of my invention which illustrates an electromagnetic force generator means as a replacement for the electrodynamic drive system shown in FIG. 1.
Figure 3:
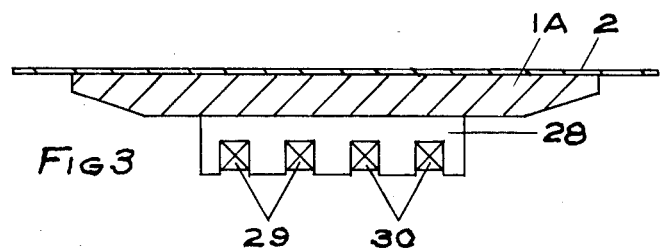

FIG. 3 is a detail illustrating an alternate arrangement of the E and I magnetic laminations in the electromagnetic force generating means illustrated in FIG. 2. The inverted arrangement of the E and I lamination assemblies as shown in FIG. 3 greatly increases the power output capability of the transducer by transmitting the heat generated in the coils directly to the vibratile piston which in turn is in direct contact with the water in which the transducer is immersed during operation.

Figure 1:
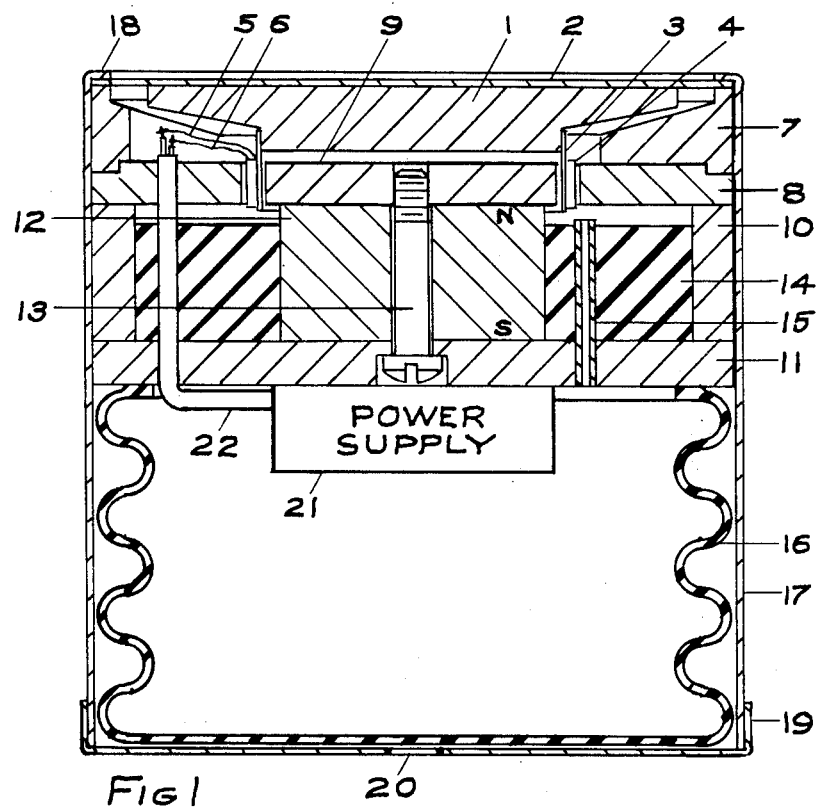
FIG. 1 is a vertical cross-sectional view of one preferred form of my invention which illustrates the use of an electrodynamic force generator means to drive the vibratile piston sound radiating portion of the inventive transducer.

Referring more specifically to FIG. 1, a vibratile piston structure 1 is bonded to a thin circular disc 2 using epoxy cement or any other suitable cement well known in the art. To the small diameter portion of the piston 1 is cemented the voice coil assembly which comprises the cylindrical coil form 3 over which is wound the voice coil 4 which generally comprises several layers of insulated copper conductors. In conventional dynamic speakers as used in radio and TV sets, the coil form 3 is usually made of paper which is placed over a cylindrical mandrel and then 2 or 4 layers of insulated copper wire are wound and cemented over the paper collar. Although the same construction may be used for the voice coil illustrated in FIG. 1, it is preferable to use an insulated metal strip instead of paper for the voice coil, to increase the power rating of the inventive transducer construction. This special modification of the coil form will provide a direct conducting path from the voice coil conductors, where the heat is generated at high-power operation, to the vibratile piston 1 whose outer surface is in direct contact with the water which acts as an infinite low temperature heat sink which will permit large increases in voice coil current, thereby to result in a large increase in the source level output of the transducer. A preferred material for the piston 1 is aluminum which may be anodized to further insure complete insulation for the attached insulated metal strip 3. The ends of the coil extending from the first turn 5 and from the last turn 6 serve as terminal leads to which alternating current is supplied to generate an oscillatory force to drive the vibratile piston 1.

The outer periphery of the circular disc 2 is located concentrically with the inside diameter of the coil form 3 during the cementing of the piston 1 to the circular disc 2 using suitable locating gages during the assembly. The coil and piston assembly is then attached by suitable well known cement such as epoxy at the peripheral surface of the thin disc member 2 to the end face of the rigid tapered washerlike tubular portion 7 of the mechanical frame structure. The member 7, including the attached piston and voice coil assembly, is then located by the periphery of the top undercut rim surface of top plate 8 as illustrated. Locating gages are used during the assembly stages to insure that the centerline of the voice coil collar 3 coincides with the centerline of the top plate 8 thereby insuring the precise location of the voice coil inside the air gap formed by the soft iron top plate 8 and soft iron pole piece 9. The remainder of the magnetic structure includes the cylindrical soft iron yoke 10, the bottom soft iron plate 11 and the cylindrical permanent magnet 12 marked with its polarity N and S. The complete magnetic structure is held together by the screw 13 as shown. It is preferable to apply a thin coating of cement to the contact surfaces of the magnetic structural assembly to prevent any possible displacement of the air gap after tightening the screw 13.

Before describing the remainder of the mechanical structure, specific details of the novel design of the sound generating portion of the transducer to achieve the stated objects of the invention will be described. In order to achieve a uniform source level response characteristic for the transducer over the approximate frequency range 100 Hz to 5 kHz, it is one feature of this invention that the ratio of the piston diameter over the wavelength of the generated sound be made equal to approximately ⅓ at the highest frequency of operation. If the piston is not circular, then the equivalent diameter of the piston is made equal to ⅓ wavelength (the equivalent diameter is defined as the diameter of a circle whose area is equal to the area of the non-circular piston). For this condition, the water load on the face of the piston will remain constant over the entire operating frequency range and the radiation of sound from the vibrating piston will be omnidirectional. For the indicated upper frequency limit of 5 kHz, where the wavelength of sound in water is approximately 12", the maximum preferred piston diameter is 4". If a higher upper frequency limit is desired, the diameter of the piston is proportionately decreased and for a lower upper frequency limit, the diameter may be proportionately increased if desired. For a 4" diameter piston generating sound underwater at all audio frequencies up to 5 kHz, the water load acting on the piston is independent of frequency and is equal to approximately 320 grams. This relatively large water load mass is added to the mass of the physical piston 1.

In prior art underwater dynamic speaker designs for use as audio frequency calibration sources, relatively lightweight conical diaphragms have been used with voice coils attached to the small end of the diaphragm similar to the conventional construction used in home radio loudspeakers. Some of the cone diameters that have been employed for wideband underwater sound sources have been in the general vicinity of 5" to 8". For an 8" diameter diaphragm, the water load when radiating sound in the frequency range below 2½ kHz is approximately 2,500 grams. With this enormous water load mass that must be displaced by the lightweight diaphragm, it is not surprising that such prior art underwater sound source designs are subject to distortions and non-uniformities in the acoustic output due to the inherent flexural resonances that occur over various parts of the lightweight diaphragm surface at different frequencies. Another disadvantage of the prior art lightweight diaphragms is that the vibrating element is not structurally strong and, therefore, the transducer is not reliable for use at sea or for launching from moving vessels. The prior art transducer can only be used under laboratory conditions with very delicate handling and with the disadvantages of low-power output and the presence of non-linear distortions over the operating frequency range, especially in the higher frequency region above 1 kHz. All these disadvantages are overcome by the present design which will be described below in greater detail.

The inventive design takes advantage of the high water loading on the vibrating piston and uses a rugged piston construction as illustrated in FIG. 1 which is approximately 4" diameter and made from ⅜" thick solid aluminum plate. The rugged piston as described, although weighing approximately 125 grams, actually represents less than 30% of the total effective mass of the vibrating system. The piston designed as described moves as a rigid piston without exhibiting any undesireable flexural resonances over the entire operating frequency range. This massive rigid piston design provides a very rugged structure that can be launched in rough seas without damage and it sacrifices no significant loss in output sound level because the massive piston design does not add appreciably to the existing water load of 320 grams which effectively determines the performance characteristics of the transducer. The inventive design takes advantage of the relatively high magnitude of water load imposed on the vibratile piston and utilizes a massive rigid vibratile structure to produce a very strong and highly reliable transducer which generates a uniform source level over the entire frequency range 100 Hz to 5 kHz and is free of flexural vibrations and distortions. By using metallic heat conducting voice coil collar 3 as described above, the power handling capacity of the transducer is greatly increased because the increased heat generated in the coil 4 under high-power operation will be conducted through the metal coil form 3 directly to the main body of the aluminum piston and then directly into the water which is in contact with the outer surface of the piston during submergence into the sea.

In order to achieve uniformity in source level over the entire frequency range of operation, it is necessary to adjust the thickness of the thin circular disc 2 so that the magnitude of the stiffness of the unsupported annulus portion of the disc that remains between the outer periphery of the piston 1 and the inner periphery of the extended tubular tip end of the support member 7 resonates with the total mass of the vibratile piston assembly plus water load at a frequency below the lowest frequency of operation of the transducer. By satisfying the following requirements for the inventive transducer design the basic objectives of the invention will be achieved:

1. The vibratile piston is a rigid massive plate free of flexural resonances over the entire frequency range of operation;

2. The resonance frequency of the transducer when operating underwater is made lower than the lowest frequency of operation of the transducer;

3. The mechanical impedance of the vibrating system is mass controlled over the entire frequency range of operation (the controlling mass being the sum of the masses of the piston assembly plus the water load which remains constant over the operating frequency range);

4. The diameter of the vibratile piston is not greater than approximately ⅓ wavelength of the sound generated in the water at the upper end of the frequency range of operation.

The illustrative example above disclosed has presented the necessary basic design parameters of a specific transducer which incorporates the teachings of this invention to pr6duce a new transducer design to meet the objectives set forth in this disclosure.

Additional details of the transducer design, especially as it relates to making it operate successfully at varying water depths are also illustrated in FIG. 1. To facilitate the design of a pressure equalization system that will automatically adjust the pressure in the sealed space behind the piston to the external water pressure, most of the empty space inside the magnetic frame assembly is filled with a solid potting material 14 such as epoxy or wax. A tapered washerlike ring 7 fills additional space behind the vibratile piston 1. A small breather tube 15 is held in place through a hole provided in plate 11 before the potting material 14 is placed in position. After assembly of the magnetic structure, the tube 15 provides communication between the reduced sealed space behind the piston and the large space below the surface of the bottom plate 11.

To achieve automatic pressure equalization within the reduced volume of atmosphere that remains behind the piston 1 inside the assembled magnetic structure, a collapsible molded rubber wall portion 16 of the outer housing construction is cemented with any well known waterproof rubber cement to the rear peripheral face of bottom plate 11 as illustrated in FIG. 1. The flexible rubber housing 16 is a cylindrical cup-shaped structure closed at one end and open at the opposite end which is attached to the periphery of the bottom plate 11. The cylindrical wall portion of the flexible housing 16 is corrugated as illustrated in FIG. 1 so that it can collapse easily when external water pressure acts on its outer surface. The collapse of the flexible housing will take place automatically with increased depth of submergence until the compressed atmosphere inside the sealed transducer structure is equal to the external water pressure at the operating depth. If it is desired to operate at water depths down to 500 ft., for example, the volume of the space inside the collapsible housing 16 must be at least 15 times the total volume inside the sealed transducer assembly. For operational depths of 100 ft., the collapsible volume must be at least 3 times the volume inside the transducer assembly. Preferably more than the minimum required volume should be provided inside the collapsible housing 16 to insure that a reserve amount of compressed atmosphere remains inside the collapsed rubber housing structure at the desired maximum operating depth. To avoid condensation of moisture that could occur inside the sealed assembly when the transducer is immersed in cold water, it is preferable to replace the air inside the sealed housing by an inert dry gas such as nitrogen during the final assembly operation.

To complete the transducer assembly, an outer housing structure 17 is provided consisting of thin walled aluminum tube with an inner diameter to fit over the external diameter of the transducer structural assembly. One end of the tubular housing is formed with a right angle flange portion 18 as illustrated. The width of the flange is made equal to the width of the extended circular support portion of part 7 to which the periphery of the diaphragm 2 is attached. A suitable waterproof cement such as epoxy is applied to the underside face of the flange portion 18 during assembly. To further reduce the manufacturing cost for large quantity production when special tooling costs can be economically justified, the separate thin walled disc member 2 can be combined with the flanged portion 18 of the tubular housing 16 to become the bottom portion of a thin walled aluminum can which will replace the tubular housing. The vibratile piston 1 will then simply be attached concentrically to the inside bottom surface of the can to provide the compliant mounting for the vibratile piston assembly.

The length of the housing 17 at its open flangeless end extends slightly beyond the outer flat surface of the pressure equalizing collapsible housing 16. An aluminum lid 19 fits over the open end of the cylindrical housing structure 17 to complete the assembly. A hole 20 is provided in the top of lid 19 as shown to permit water entry during submergence for the purpose of collapsing the flexible housing 16 until the internal pressure in the transducer is equalized to the external submerged water pressure. If it is desired to equalize the water pressure with the internal pressure more precisely, another hole may be added through the side wall of the housing 17 in the vicinity of the sealed end of the flexible housing 16. The side hole, which will be closer to the exposed surface of piston 1, will result in a smaller differential pressure between the external water pressure acting on the exposed surface of the piston 1 and the equalized internal pressure because of the smaller difference in water depth between the side hole and the outer piston surface as compared with the greater separation between hole 20 and the piston surface.

If the wide range underwater transducer is to be used as an expendable calibration sound source for special applications, a potted power supply 21 for operating the transducer can be attached to the bottom plate 11 as illustrated schematically in FIG. 1. A cable 22 is connected between the power supply and the voice coil leads 5 and 6 as illustrated.

FIG. 2 illustrates an alternate design of an electromechanical force generator to replace the electrodynamic drive system described in FIG. 1. The vibratile piston 1A is similar to the tapered portion of piston 1. The cylindrical collar portion of the piston 1 is replaced with a parallel flat surface in piston 1A to which is bonded, with suitable cement such as epoxy, a stack of I laminations 23. A cup-shaped aluminum housing 25 holds the stack of E laminations 24 securely cemented to its inner surface and it is positioned accurately to mate with the stack of I laminations 23 to establish a uniform air gap 26 at assembly. A coil of copper wire 27 is potted into the slots of the E laminations using a rigid potting compound such as epoxy. The coil leads (not shown) are connected to a power supply similar to the schematic arrangement illustrated in FIG. 1. The electromagnetic oscillatory forces are generated by alternating current supplied to the coil 27 which modulates the dc bias flux in the air gap which is provided in the conventional manner well known in the art such as supplying direct current to the coil 27 from the power supply to provide the biasing flux or by using permanent magnets in the magnetic circuit as is also well known in the art and is not a part of this invention. The remainder of the details of the assembly are identical to the details already described in FIG. 1. The potting material 14A and the communicating tube 15A provide the identical functions as their counterparts 14 and 15 described in FIG. 1.

FIG. 3 illustrates a modification of the electromagnetic force generating system shown in FIG. 2. The same piston 1A as was used in FIG. 2 is also used in the construction of FIG. 3. The I laminations 23 of FIG. 2 are replaced by the E lamination assembly 28. Two of the four slots shown in the lamination stack are filled with the coil 29 and the other two slots are filled with the coil 30 which is identical to coil 29. The two coils may be connected either in series or parallel to provide either a lower or higher impedance as desired. An I lamination stack similar to 23 shown in FIG. 2 will be potted in a housing structure similar to housing 25 and the revised housing structure will be used with the modified vibratile piston assembly illustrated in FIG. 3 to complete the alternate high-power design of the electromagnetic force generating system. The construction of FIG. 3 will permit the use of increased electrical input power to the coils compared to the electromagnetic structure shown in FIG. 2 because of the direct transmission of the heat generated by the coils 29 and 30 into the piston 1A which is in direct contact with the sea which acts as an infinite heat sink to greatly reduce the temperature rise in coils 28 and 29.

Although a few specific examples have been given to illustrate the advantages of the disclosed invention, it should be understood that various additional modifications and alternative constructions may be made without departing from the true spirit and scope of the invention. Therefore, the appended claims are intended to cover all such equivalent alternative constructions that fall within their true spirit and scope.

I claim:
1. An underwater electroaccoustic transducer comprising a rigid frame structure, a massive, rugged vibratile plate member having an outer surface area portion adapted for imparting oscillatory vibrations into the water when the transducer is immersed therein, said vibratile plate member also having an inner surface area portion which is sealed from exposure to the water when the transducer is submerged therein, flexible support means attached to said vibratile plate member, said flexible support means characterized in that it holds said vibratile plate member accurately positioned with reference to a prescribed mechanical axis of said rigid frame structure, said prescribed mechanical axis characterized in that it is an axis of symmetry along which said oscillatory vibrations from said vibratile plate member are propagated in the water during operation of the transducer, electromechanical oscillatory force generating means associated with said vibratile plate structure, electrical terminal means connected to said electromechanical oscillatory force generating means, said flexible support means further characterized in that the stiffness of said flexible support means in combination with the total effective mass of said vibratile plate member including the water load on said vibratile plate member resonates at a frequency below the operating frequency of the transducer, said vibratile plate member further characterized in that the equivalent diameter of said vibratile plate member is less than $\frac{1}{3}$ wavelength of the sound generated by said vibratile plate member at the operating frequency of the transducer.

2. The invention in claim 1 further characterized in taht the frequency range of operation is approximately 100 Hz to 5 kHz.

3. The invention in claim 1 further characterized in that said electroacoustic transducer assembly includes a sealed housing structure and still further characterized in that said housing structure includes a collapsible wall portion whose outer surface is exposed to the water pressure of the sea at the depth to which the transducer is submerged during operation whereby the wall collapses until the internal pressure of the sealed atmosphere inside the transducer increases until it becomes approximately equal to the external water pressure acting on the surface of the vibratile plate member during operation.

4. The invention in claim 3 further characterized in that said collapsible wall portion has sufficient collapse capability to reduce the volume of the sealed atmosphere inside the transducer down to at least $\frac{1}{3}$ the normal volume contained inside the sealed housing structure at normal atmospheric pressure before immersing the transducer into the sea.

5. The invention in claim 4 further characterized in that the volume of the sealed atmosphere inside the transducer is reducible down to the order of 1/15 the normal volume contained at atmospheric pressure whereby the transducer will remain operable when submerged to depths down to 500 ft.

6. The invention in claim 3 characterized in that the atmosphere inside the transducer housing is an inert dry gas.

7. The invention in claim 6 further characterized in that the dry gas is nitrogen.

8. The invention in claim 1 characterized in that said electromechanical oscillatory force generating means includes an electrodynamic force generator comprising a coil of insulated wire residing in a magnetic field and means for attaching said coil to said vibratile plate member, and further characterized in that an oscillatory force is generated in the coil of wire when an alternating current is supplied to the coil, said oscillatory force is proportional to the product of the flux density in which the coil resides multiplied by the magnitude of the current flowing through the coil, whereby the magnitude of the sound pressure level generated by the vibratile plate for constant current input to the coil will be uniform over the entire operating frequency range of operation of the transducer.

9. The invention in claim 1 characterized in that said vibratile plate member is a rigid circular piston.

10. The invention in claim 9 further characterized in that said flexible support means comprises a compliant washer-shaped member, and further characterized in that the inner peripheral portion of said washer-shaped member is concentrically attached to the outer peripheral surface of said rigid circular piston and still further characterized in that the outer peripheral portion of said washer-shaped member is concentrically attached to a concentric mating peripheral surface portion of said rigid frame structure, said compliant washer-shaped member characterized in that it provides high radial stiffness in order to maintain the precise axial location of said circular piston, and further characterized in that the magnitude of the flexural stiffness of said washer-shaped member resonates with the effective underwater mass of the vibratile piston including the water load on said vibratile piston at a frequency below the operating frequency of the transducer.

11. The invention in claim 10 further characterized in that the diameter of said vibratile piston is less than one wavelength of sound generated by the transducer at the frequency of operation.

12. The invention in claim 11 further characterized in that the diameter of said vibratile piston is no greater than $\frac{1}{3}$ wavelength of sound generated at the operating frequency.

13. The invention in claim 10 further characterized in that said electroacoustic transducer assembly includes a sealed housing structure including a thin-walled circular closed end, said closed end portion of said housing having an inside diameter greater than the outside diameter of said vibratile circular piston, and further characterized in that said circular piston is concentrically and securely fastened to the inside surface of the closed circular end portion of said housing structure whereby the compliant washer-shaped unattached annular portion of said thin-walled closed end of said housing structure provides the flexible support means for said vibratile piston.

14. The invention in claim 13 further characterized in that said housing structure includes a collapsible wall portion whose outer surface is exposed to the water pressure of the sea at the depth to which the transducer is submerged during operation whereby the wall collapses until the pressure of the sealed atmosphere inside the transducer increases until it becomes approximately equal to the external water pressure acting on the outer surface of the vibratile piston.

15. The invention in claim 14 further characterized in that the atmosphere inside the transducer housing is an inert dry gas.

16. The invention in claim 15 further characterized in that the dry gas is nitrogen.

17. The invention in claim 1 characterized in that said electromechanical oscillatory force generating means includes an electromagnetic force generator comprising a first magnetic flux conducting structure having a plane surface, means for rigidly attaching said first magnetic flux conducting structure to the said inner surface of said vibratile plate, said plane surface of said first magnetic flux conducting structure characterized in that it is held perpendicular to said prescribed mechanical axis, a second magnetic flux conducting structure having at least one plane surface, means for rigidly attaching said second magnetic flux conducting structure to said rigid frame structure, said attachment means characterized in that it holds said plane surface of said second flux conducting structure opposite and parallel to the plane surface of said first flux conducting structure thereby establishing an air gap of specified thickness between said two mating flux conducting structures, said parallel surface of said second magnetic flux conducting structure characterized in that a plurality of slots are provided into the parallel plane surface of said magnetic flux conducting structure, at least one coil wound with insulated electrical conductors and dimensioned to fit with adequate clearance within a pair of slots provided into the plane surface of said second magnetic flux conducting structure, rigid potting means filling said clearance space between said coil and said slots, electrical terminal means connecting to said coil and means for generating controlled electromagnetic forces in said magnetic air gap by supplying controlled electrical power to said electrical terminal means.

18. The invention in claim 17 further characterized in that the frequency range of operation is approximately 100 Hz to 5 kHz.

19. The invention in claim 17 further characterized in that said electroacoustic transducer assembly includes a sealed housing structure and still further characterized in that said housing structure includes a collapsible wall portion whose outer surface is exposed to the water pressure of the sea at the depth to which the transducer is submerged during operation whereby the wall collapses until the internal pressure of the sealed atmosphere inside the transducer increases until it becomes approximately equal to the external water pressure acting on the surface of the vibratile plate member during operation.

20. The invention in claim 19 further characterized in that the volume of the sealed atmosphere inside the transducer is reducible down to the order of 1/15 the normal volume contained at atmospheric pressure whereby the transducer will remain operable when submerged to depths down to 500 ft.

* * * * *